Patented Mar. 4, 1924.

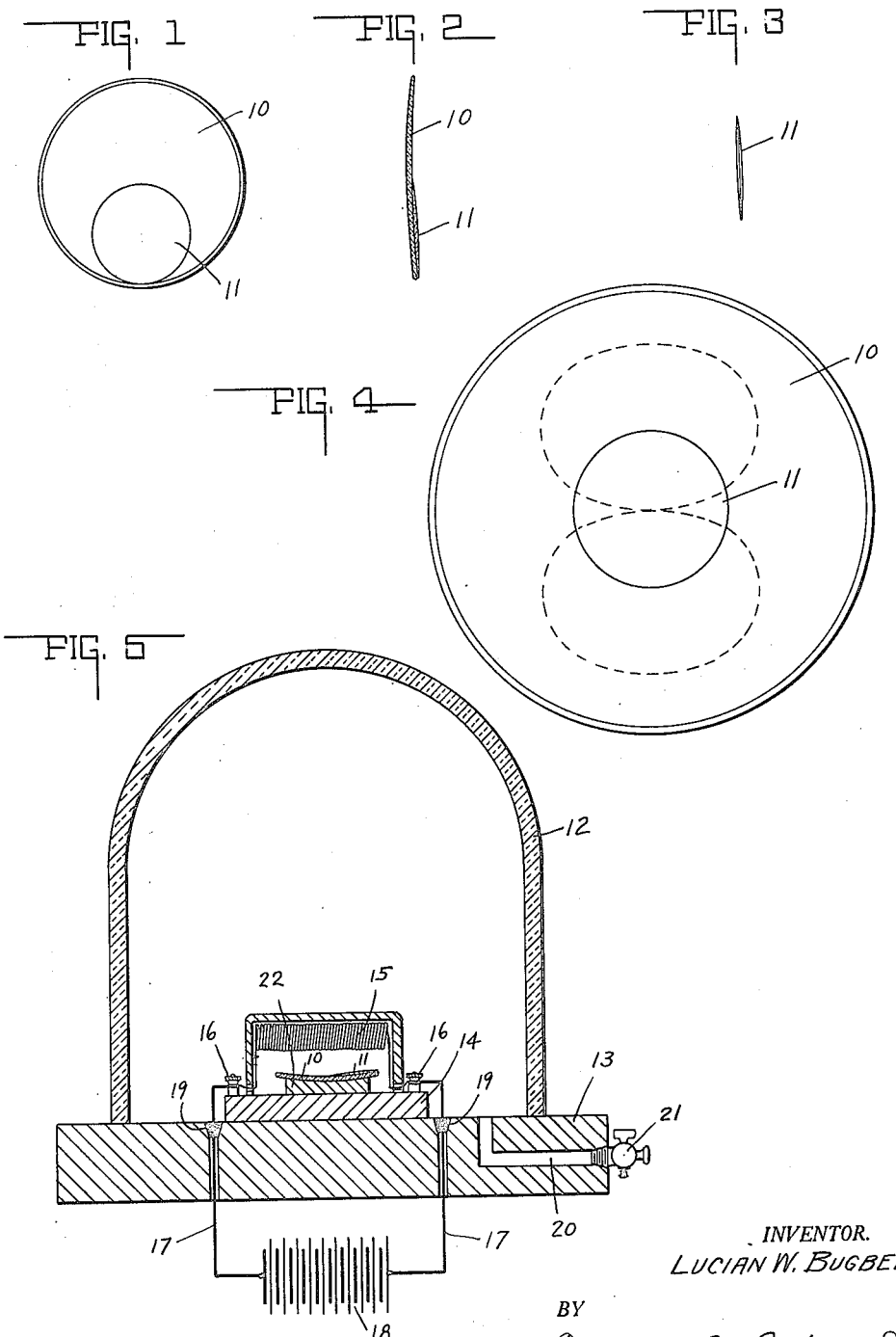

1,485,589

UNITED STATES PATENT OFFICE.

LUCIAN W. BUGBEE, OF INDIANAPOLIS, INDIANA, ASSIGNOR TO FRANKLIN OPTICAL COMPANY, OF INDIANAPOLIS, INDIANA, A CORPORATION.

PROCESS OF MAKING FUSED BIFOCAL LENSES.

Application filed April 16, 1923. Serial No. 632,458.

*To all whom it may concern:*

Be it known that I, LUCIAN W. BUGBEE, a citizen of the United States, and a resident of Indianapolis, county of Marion, and State of Indiana, have invented a certain new and useful Process of Making Fused Bifocal Lenses; and I do hereby declare that the following is a full, clear, and exact description thereof, reference being had to the accompanying drawings, in which like numerals refer to like parts.

This invention relates to a new process or method of fusing two part bifocal or multifocal lenses.

The object of the invention is to provide a simple and inexpensive method of fusing two pieces of glass together for two different visual fields as in Kryptok lenses by which the disadvantages presented in the manner or method of heretofore making fused bifocals is obviated. Fused bifocal lenses have heretofore been produced by placing a so-called button, providing one visual field, in proper place upon a lens blank, and then applying heat upon the surface of the button for causing it to fuse into the surface of the lens blank. The difficulty attending this method is that pockets of air are imprisoned during the fusing process, thus making aberrations in the fused surfaces. Effort has been made to expel the air from between the adjacent surfaces during the fusing process by providing a wedge at one point between the surfaces, separating the same so as to permit the air to escape from one side as the fusing process proceeds from the other side of the button. However, that method is unsatisfactory as the ordinary fusing button is not of sufficient weight to expel all of the air, and it is also difficult to arrange the wedge and properly seat the button. Another difficulty heretofore had in so fusing lenses is that the air upon coming in contact with the highly heated surfaces of the glass, creates a chemical action, which appreciably effects the highly polished surfaces of the lenses.

The principal feature of this invention lies in the method of fusing separate pieces of glass, which will overcome the difficulties heretofore had, by conducting the fusing operation in a vacuum. This is accomplished by applying heat for fusing the glass and surrounding the heating element and glass with a bell jar from which the air has been pumped so that there will be a high degree of vacuum therein.

The full nature of this invention will be understood from the accompanying drawings and the following description and claims.

In the drawings Fig. 1 is a plan view of a fused bifocal lens completed by means of this process. Fig. 2 is a central vertical section therethrough. Fig. 3 is a side elevation of a button or reading segment to be fused thereon. Fig. 4 is a modified form of lens blank showing the button fused thereon. Fig. 5 is a central vertical section through the vacuum jar and heating element illustrating the method of applying heat for the fusing process within a vacuum.

In the drawings there is shown a lens 10 having a major portion which in the usual bifocal lens represents the distance visual field, upon which is fused a button or reading segment 11, which in conjunction with the distance visual field provides a near or reading visual field. The lens 10 is ground in the usual manner in the form of a lens blank having throughout a single visual field, and the button or segment 11 is likewise ground to the proper curvature and thickness independently thereof, the two separate pieces of glass thus formed being preferably of the same co-efficient of expansion and of either the same or different indices of refraction. Proper grinding of the lens blank or button may be accomplished in several ways familiar to those skilled in the art, so that they are properly prepared and fitted to be united by the fusing process, the bifocal bearing face of the lens 10 having been suitably ground and polished.

For the fusing process there is provided a bell jar 12 of the usual type supported upon a bench or table 13. The surface of the table may be covered with grease for making an air tight seal at the bottom edge of the jar or an air tight seal therefor may be provided in any other suitable manner. Mounted within the bell jar and supported upon the table 13, there is a heating element having a base 14 upon which is mounted an electrical resistance coil 15 spaced above the base. The coil is electrically connected with the terminals 16, which in turn are connected with the lead wires 17 leading from a source of current 18. Said wires extend through the table 13 and are surrounded with an air tight seal 19. This seal may be formed by melting a suitable material and permitting it to solidify in a recess in the top of the table to the lead wires 17. Extending through the table 13 and opening therefrom within the closure of the jar 12 there is an air duct 20 having a valve 21 adapted to be connected with a vacuum pump of any suitable type, not shown herein.

To fuse the lens, the lens blank 10 is placed upon a lens block 22 having a suitably curved upper surface to conform to the curvature of the lens. The button 11 is then placed in proper position upon the lens blank 10, the surface thereof having been polished and cleansed. The operator then places the block 22 upon the base 14 of the heating element, places the jar 12 thereover, and pumps the air therefrom, producing a high degree of vacuum within said chamber. The pumping of the air from the chamber will draw what air there may be from between the button 11 and the blank 10, so that where the surfaces therebetween do not meet there will be a high degree of vacuum. The current is then turned on so that a high degree of heat is directed down upon the button 11. The highly heated button, even with its light weight, will fuse into the surface of the blank 10, both the button and that portion of the blank upon which it is placed being in a soft or pliable condition. The button will naturally shape itself on to the under-lying surface of the blank and thereby become fused or firmly united therewith. The air having been previously removed from between the adjacent surfaces of the button and blank, there will, of course, be no difficulty from air bubbles or aberrations caused thereby, and the fact that there is no air surrounding the highly heated surface of the glass will eliminate any chemical action and the accompanying effect. After this operation has been completed and the glass has cooled, by turning off the electric current, air may be permitted to pass into the vacuum chamber and the jar removed. The fused bifocal blank may then be suitably cut to the desired shape, and if necessary be properly surfaced in the usual manner.

Although the above description of the process or method of fusing bifocal or multifocal lenses in a vacuum has been described in detail, this process may be equally well employed with respect to fusing other types and kinds of lenses or optical glasses where it is desirable to avoid aberration between their fused surfaces by reason of the air pockets or bubbles, or the accompanying effect of air on the highly heated optical surfaces.

The invention claimed is:

1. The process of producing a bifocal lens consisting of providing a major lens surface, placing a second lens surface thereon, surrounding the same with a vacuum for drawing the air from between their adjacent surfaces, and subjecting the same to sufficient heat for causing them to fuse and unite in a unitary lens.

2. The process of producing a bifocal lens consisting of providing a major lens surface and a separate minor lens surface, placing the same within a chamber, creating a vacuum in said chamber so as to draw the air from between the adjacent lens surfaces and applying heat thereto within said vacuum sufficient to fuse and unite said lenses in a unitary structure.

3. The process of producing a multifocal lens consisting of grinding a major surface with a single curvature, grinding a minor surface in a separate piece of glass with a single curvature for producing the desired addition to the major surface, placing the minor surface on the major surface, withdrawing air from between said surfaces, and applying sufficient heat thereto to fuse the same and unite them into a single lens structure.

4. The process of producing a multifocal lens consisting of grinding a major surface with a single curvature, grinding a minor surface in a separate piece of glass with a single curvature for producing the desired addition to the major surface, placing the minor surface on the major surface, placing both surfaces in a chamber, withdrawing air from said chamber so as to create a vacuum therein, and applying heat within said chamber to said surface while the air is withdrawn therefrom for fusing the same and causing them to unite in a single lens structure.

5. In the process of making Kryptok lenses, placing the pieces of glass constituting the major and minor field in a vacuum and heating the same while therein sufficiently to fuse them.

6. In the process of making Kryptok lenses, placing the pieces of glass of which the lens is to be composed in a vacuum chamber, extracting the air therefrom, and electrically heating the same while the air is extracted therefrom.

In witness whereof, I have hereunto affixed my signature.

LUCIAN W. BUGBEE.